(12) United States Patent
Engholm

(10) Patent No.: US 7,477,286 B2
(45) Date of Patent: Jan. 13, 2009

(54) RECTANGULAR GAMUT DISPLAY

(75) Inventor: Kathryn A. Engholm, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 900 days.

(21) Appl. No.: 11/050,363

(22) Filed: Feb. 2, 2005

(65) Prior Publication Data

US 2006/0171000 A1    Aug. 3, 2006

(51) Int. Cl.
*H04N 17/02* (2006.01)
*H04N 9/68* (2006.01)

(52) U.S. Cl. .................. 348/185; 348/186; 348/649; 348/645

(58) Field of Classification Search .......... 348/649, 348/645, 687, 184–186, 191, 189, 180; 702/66, 702/67; 345/589–591; 358/520; *H04N 17/00, H04N 17/02, 9/68, 9/64, 5/57*
See application file for complete search history.

(56) References Cited

U.S. PATENT DOCUMENTS

| 4,707,727 A | 11/1987 | Penney |
| 5,307,087 A | 4/1994 | Baker |
| 5,519,440 A | 5/1996 | Baker |
| 6,828,981 B2 | 12/2004 | Richardson |
| 7,327,384 B2 * | 2/2008 | Ivers .................... 348/645 |
| 2004/0218044 A1 | 11/2004 | Baker |

* cited by examiner

*Primary Examiner*—Sherrie Hsia
(74) *Attorney, Agent, or Firm*—Francis I. Gray

(57) ABSTRACT

A system for providing an easily usable composite legality and component gamut display translates a video input signal into a plurality of component and composite format signals. A user selects from the plurality of component and composite format signals a pair of signals for input to the y-axis and x-axis of a rectangular plot. The resulting rectangular plot includes every pixel within a video frame of the video input signal and, together with prescribed limits, is displayed to provide a visual indication of composite legality and/or component gamut.

2 Claims, 4 Drawing Sheets

COMPOSITE LEGALITY VS LIGHTNESS
FOR NTSC TYPICAL LIMITS

RGB GAMUT VS LIGHTNESS
FOR TYPICAL SIGNAL LIMITS

RECTANGULAR GAMUT DISPLAY

BACKGROUND OF THE INVENTION

The present invention relates to the display of color characteristics of a television signal, and more particularly to a rectangular gamut display for determining composite legality or RGB (Red,Blue,Green) gamut violations.

Existing waveform displays plot a composite video baseband signal (NTSC, PAL, SECAM, etc.), video component signals (YUV, Y,$C_r$,$C_b$, RGB, Y,R-Y,B-Y, etc.) or a pseudo-composite signal created from the components on a y-axis against Time on an x-axis. Many users watch the waveform display for trace points that exceed their allowed y-axis values as a way of checking Composite legality or RGB gamut violations. The user is able to determine which component is in violation and at which location on the video picture, but doesn't receive information about hue, saturation or other parameters that may be useful for understanding and correcting the violations. U.S. Pat. No. 4,707,727 discloses an apparatus for providing an indication on a waveform or display monitor when a color represented by a Y, R-Y, B-Y television signal is validly reproducible on an RGB display device.

Existing gamut and legality displays, such as the Arrowhead legality display (U.S. Pat. No. 5,519,440), the Diamond gamut display (U.S. Pat. No. 5,309,087), the Spearhead gamut display (U.S. Patent Application Publication No. 2004/0218044) and the polar gamut and legality display (U.S. Patent Application Publication No. 2002/0063801), plot composite or component values against each other or against Hue in non-rectangular graphical displays in order to provide better information for understanding and correcting violations. While these graphical displays are quite elegant and do provide good information, their non-standard graph layouts are confusing to many users. The fact that there are many graph styles means that users must memorize which is useful for what ('Diamond is for Component; Arrowhead is for Composite"; etc.) and how each one must be interpreted.

What is desired is a standard graphical layout for a gamut display that is easier for a user to use.

BRIEF SUMMARY OF THE INVENTION

Accordingly the present invention provides a rectangular gamut display that is easily interpretable by a user. A system for providing an easily usable composite legality and component gamut display translates a video input signal into a plurality of component and composite format signals. A user selects from the plurality of component and composite format signals a pair of signals for input to the y-axis and x-axis of a rectangular plot. The resulting rectangular plot includes every pixel within a video frame of the video input signal and, together with prescribed limits, is displayed to provide a visual indication of composite legality and/or component gamut.

The objects, advantages and other novel features of the present invention are apparent from the detailed description when read in conjunction with the appended claims and attached drawing.

DETAILED DESCRIPTION OF THE INVENTION

Figure 1:
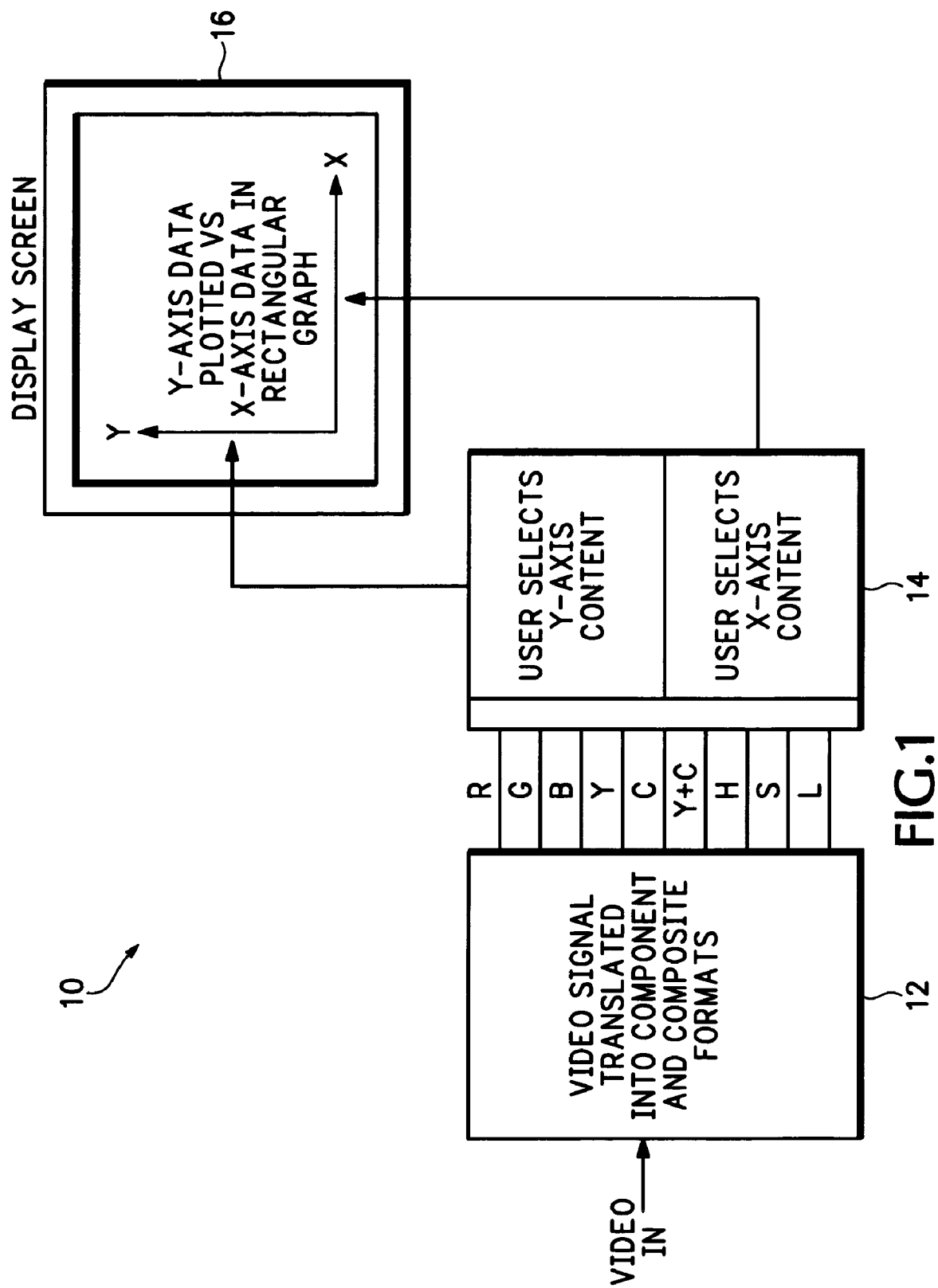
FIG. 1 is a block diagram view of a system for generating rectangular gamut displays according to the present invention.

Referring now to FIG. 1 a system 10 for generating rectangular gamut displays has an input section 12 for translating a video input signal into various component and composite formats, such as RGB (Red, Green, Blue), HSL (Hue, Saturation, Lightness), HSV (Hue, Saturation, Value), YC (Luminance, Chrominance) and Y+C. The various signals that make up the formats are input to a display selector 14 where a user selects which signal represents y-axis content and which signal represents x-axis content, i.e., the user may choose the combination that fits a particular situation and preference. The selected signals are then presented as a rectangular display on a display screen 16, which may be used for both RGB Gamut and Composite Legality tests. The basic rule for interpreting the resulting rectangular display is: "Any point outside the box is illegal or a gamut violation."

Figure 2:
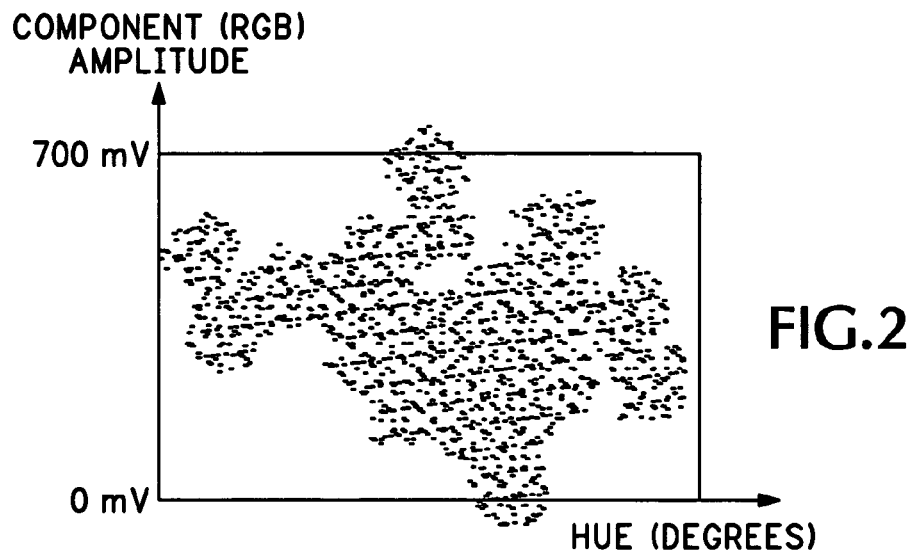
FIG. 2 is a graphic view of a component vs. hue gamut display according to the present invention.

One form of the rectangular display is illustrated in FIG. 2 where R, G and B component amplitudes, which have a valid range between zero and 700 mV, are plotted on the y-axis against Hue (0-360°) on the x-axis. This helps the user to see whether R, G or B is outside its limits and, if so, for which colors. R, G and B may be plotted individually, or may be plotted simultaneously on the same graph with different colors. This graph of component space also shows the effects of adjusting H, S, L or V on the R, G and B values.

Figure 3:
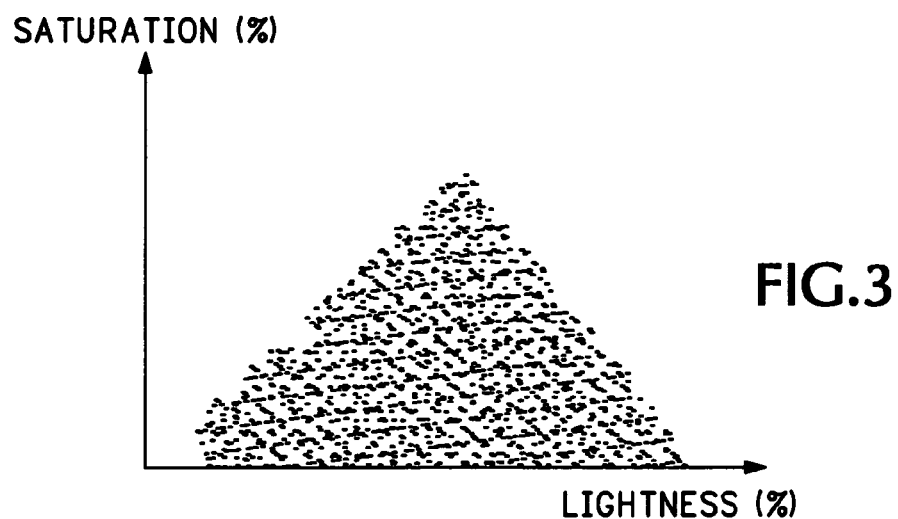
FIG. 3 is a graphic view of a saturation vs. lightness gamut display according to the present invention.

FIG. 3 plots Saturation (0-100%) against Lightness (0-100%). This graph may be useful for checking the distribution or dynamic range of colors present in a video frame. The effects on Saturation and Lightness when R, G or B are varied are readily apparent in this graph for HSL control space.

Figure 4:
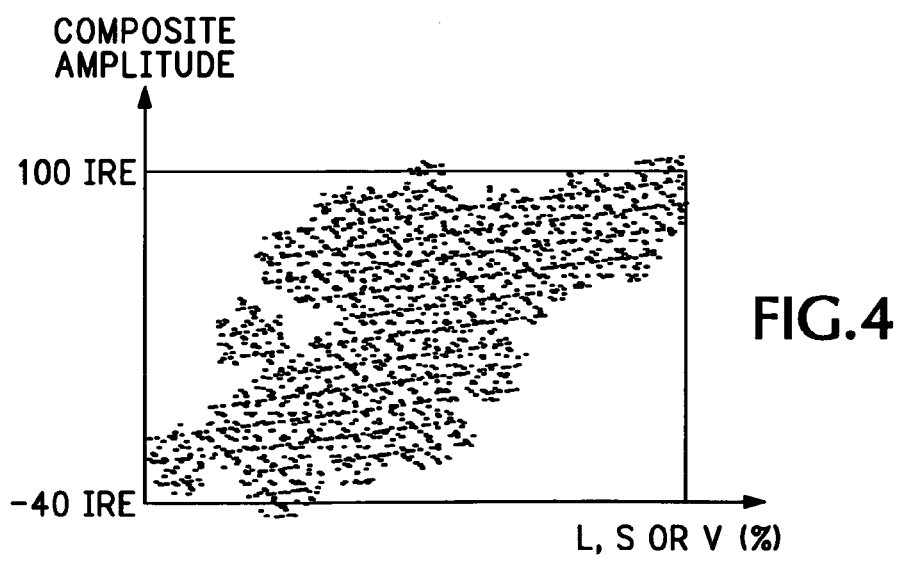
FIG. 4 is a graphic view of a composite legality vs. lightness gamut display according to the present invention.
Figure 5:
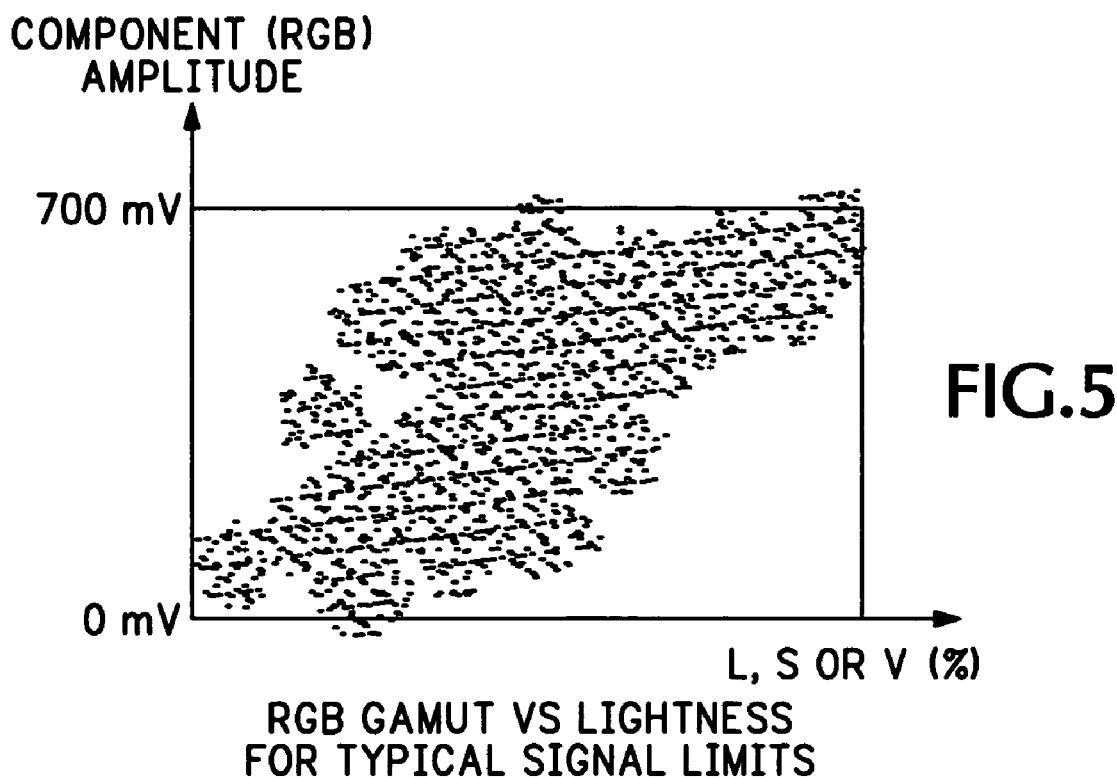
FIG. 5 is a graphic view of an RGB gamut vs. lightness gamut display according to the present invention.

FIG. 4 shows how a user may check for composite signal legality with respect to lightness, saturation or value. Both Y+C and Y−C (−40-100 IRE) are plotted on the y-axis, and L, V or S (0-100%) are plotted on the x-axis for each pixel. Legal pixels are within the rectangle while illegal pixels are above or below the rectangle. FIG. 5 shows a plot similar to FIG. 4 for checking whether R, G and/or B values (0-700 mV) are within gamut.

Figure 6:
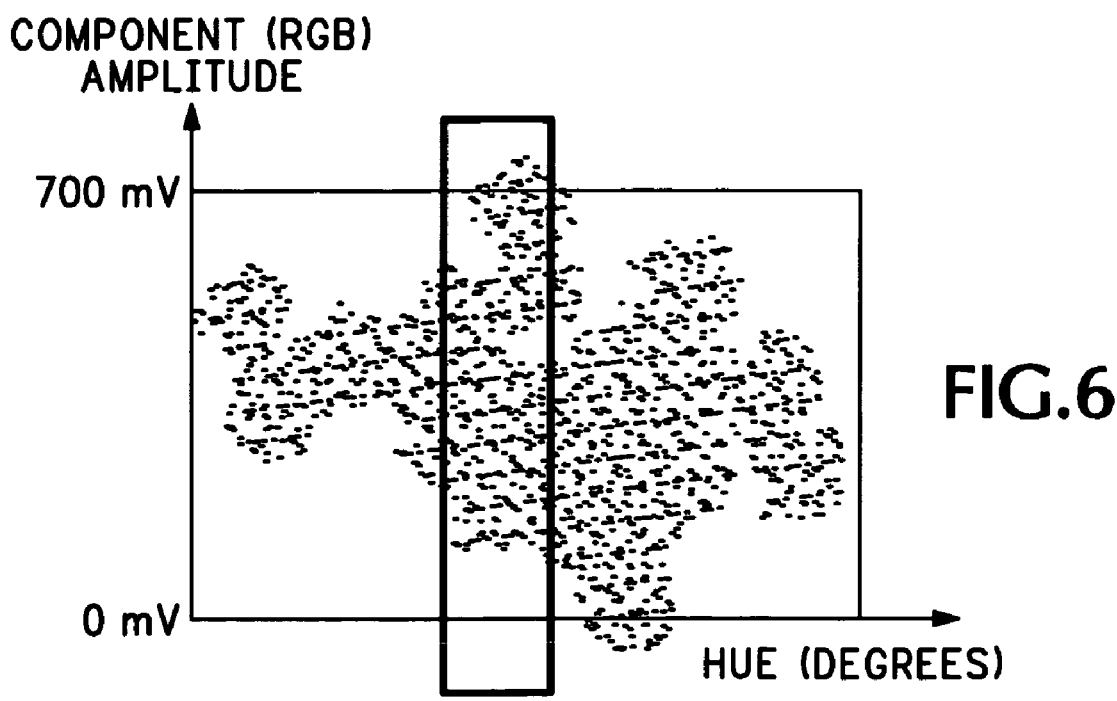
FIG. 6 is a graphic view as in FIG. 2 showing selection of a subset of points according to the present invention.
Figure 7:
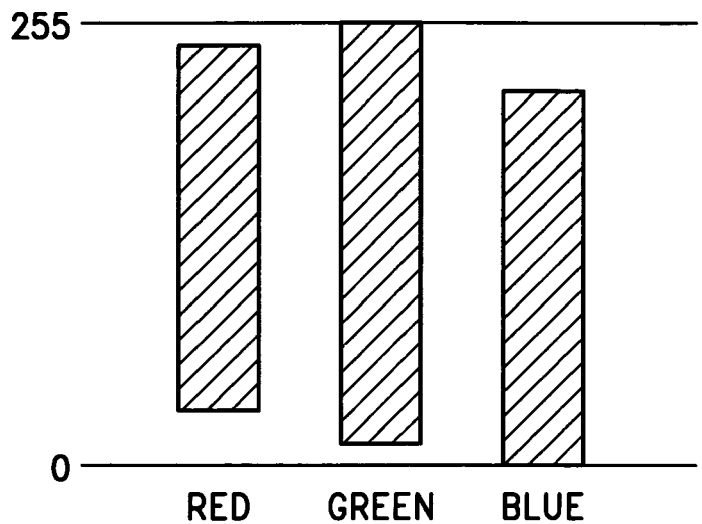
FIG. 7 is a graphic view of component bar graphs for RGB control space according to the present invention.

As shown in FIG. 6 a subset of points may be selected from the main graph to include in a secondary graph. The user controls the location and potentially shape (height and width for a rectangular area, radius for a circular area, etc.) of a selection area within the main graph. The selected pixel values may then be displayed in the secondary graph as shown in FIGS. 2-5. Finally an additional graph may be generated for RGB control space, as shown in FIG. 7. For each pixel in the Composite Legality graph of FIG. 4 the R, G and B values (0-255 for 8-bit pixel values) may be plotted in three separate bar graphs. The effects on the distribution of R, G and/or B component values, caused by adjusting H, S, L or V, are readily apparent in this graph as well as the Composite Legality graph. It should be noted that if one of the video values from the input section 12 is plotted against Time on the x-axis, the result is a conventional waveform trace.

For any of the plots created as described above a set of line may be displayed on the graph to show standard or user-selected limits for valid/legal data values. Further specific combinations may be pre-configured and named, making it even easier for users to select the right test. As indicated in U.S. Pat. No. 4,707,727 the hardware or software implementation of the present invention may perform automatic comparisons for every plot point against the prescribed limits in order to provide a pass/fail indication to the user. The indication may take many forms, including but not limited to text readout, audible warning or turning the offending data points some obnoxious color on the graph.

Figure 8:
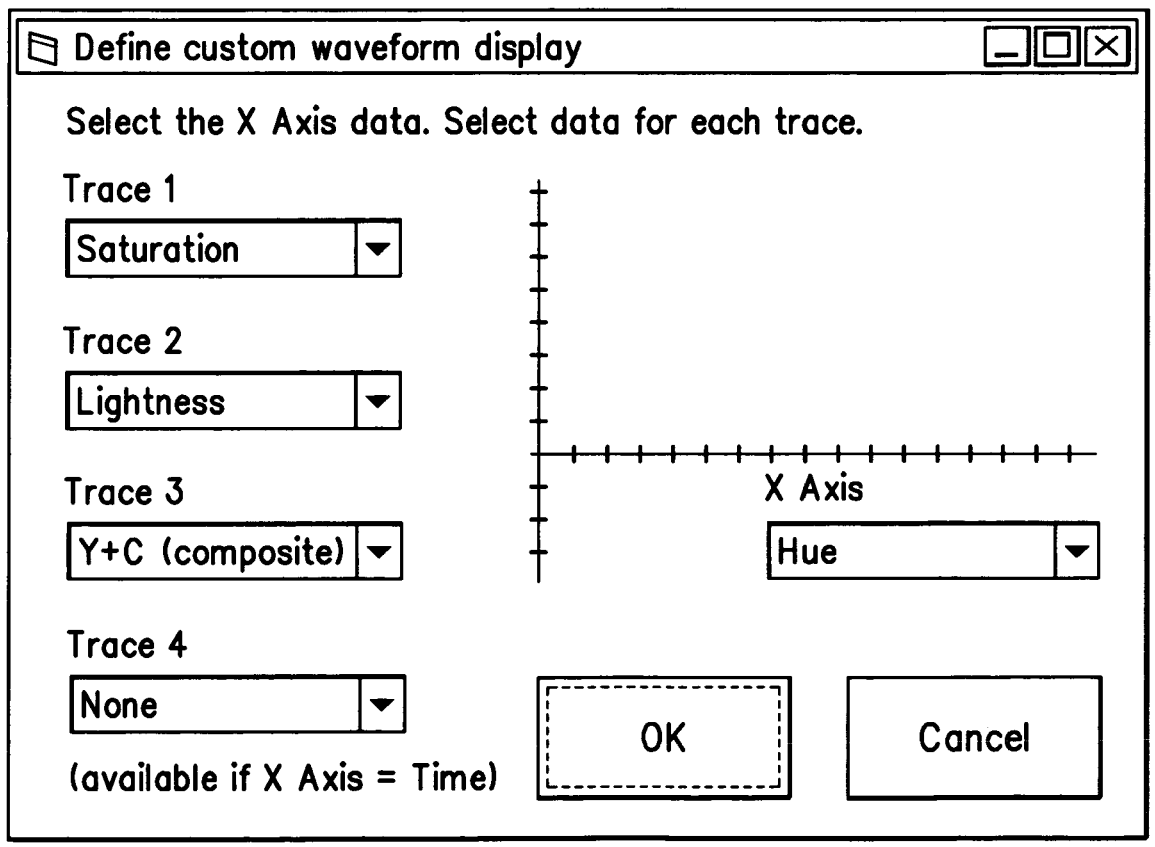
FIG. 8 is a plan view of user control display for generating a rectangular gamut display according to the present invention.

Referring now to FIG. 8 a potential implementation of the user controls is shown for assigning what data is assigned to the y-axis and the x-axis to create the custom plots. Traces 2, 3 and 4 may be omitted by selecting "none" in their drop-down list box controls.

Thus the present invention provides a system for providing a rectangular gamut/legality display by translating a video input signal into a plurality of components in different component/composite formats, selecting the particular components for input to the y-axis and x-axis of a rectangular display, and presenting the resulting plot on a display with prescribed limits.

What is claimed is:

1. A method of providing a rectangular gamut display comprising the steps of:

translating a video input signal into a plurality of component and composite format signals;

selecting from the plurality of component and composite format signals a first signal for input to a y-axis of the rectangular gamut display and a second signal for input to an x-axis of the rectangular gamut display to form a graphic plot that includes each pixel within a video frame of the video input signal; and displaying the graphic plot together with prescribed limits to visually indicate whether any pixels are outside the prescribed limits.

2. The method as recited in claim 1 further comprising the step of:

describing a shape area within the graphic plot; and repeating the selecting and displaying steps for the pixels within the shape area to produce a secondary graphic plot.

* * * * *